(12) United States Patent
Liang et al.

(10) Patent No.: US 12,418,884 B2
(45) Date of Patent: *Sep. 16, 2025

(54) PAGING METHOD, BASE STATION AND USER EQUIPMENT

(71) Applicant: DATANG MOBILE COMMUNICATIONS EQUIPMENT CO., LTD., Beijing (CN)

(72) Inventors: Jing Liang, Beijing (CN); Haiyang Quan, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/634,852

(22) Filed: Apr. 12, 2024

(65) Prior Publication Data
US 2024/0259996 A1 Aug. 1, 2024

Related U.S. Application Data

(63) Continuation of application No. 17/508,755, filed on Oct. 22, 2021, now Pat. No. 11,963,132, which is a
(Continued)

(30) Foreign Application Priority Data

Nov. 3, 2016 (CN) .......................... 201610955201.6

(51) Int. Cl.
*H04W 68/00* (2009.01)
*H04W 4/16* (2009.01)
(Continued)

(52) U.S. Cl.
CPC ........... *H04W 68/005* (2013.01); *H04W 4/16* (2013.01); *H04W 28/02* (2013.01); *H04W 68/00* (2013.01);
(Continued)

(58) Field of Classification Search
None
See application file for complete search history.

(56) References Cited

U.S. PATENT DOCUMENTS

| 11,184,873 B2 | 11/2021 | Liang et al. |
| 2013/0215834 A1 | 8/2013 | Deivasigamani |

(Continued)

FOREIGN PATENT DOCUMENTS

| CN | 101005495 A | 7/2007 |
| CN | 101047977 A | 10/2007 |

(Continued)

OTHER PUBLICATIONS

NTT Docomo, Inc., "Ue state transition diagram for NR," R2-167136, Revision of R2-164713, Discussion and decision, 9.2.2.1, 3GPP TSG-RAN WG2 #95bis, Oct. 10-14, 2016, the whole document.
(Continued)

*Primary Examiner* — Deepa Belur
(74) *Attorney, Agent, or Firm* — Ladas & Parry, LLP (57) ABSTRACT

A paging method, a base station and a UE are provided. The paging method includes: receiving, by a UE in an inactive state, a paging message for determining a paging type, the paging message being transmitted from a base station, the paging type including an access network paging initiated by an access network or a core network paging initiated by a core network; determining, by the UE, the paging type corresponding to the paging message; and when the paging type corresponding to the paging message is the core network paging, updating, by the UE, each of states of a NAS layer and an RRC layer of the UE into an idle state, and responding to, by the UE, the paging message.

20 Claims, 4 Drawing Sheets receiving, by a UE in an inactive state, a paging message for determining a paging type, the paging message being transmitted from a base station, and the paging type including an access network paging initiated by an access network or a core network paging initiated by a core network — 31 determining, by the UE, the paging type corresponding to the paging message — 32 when the paging type corresponding to the paging message is the core network paging, updating, by the UE, each of states of a NAS layer and a RRC layer of the UE into an idle state, and responding to, by the UE, the paging message — 33

Related U.S. Application Data continuation of application No. 16/345,538, filed as application No. PCT/CN2017/109060 on Nov. 2, 2017, now Pat. No. 11,184,873.

(51) Int. Cl.

| | | |
|---|---|---|
| *H04W 28/02* | (2009.01) | |
| *H04W 68/02* | (2009.01) | |
| *H04W 76/19* | (2018.01) | |
| *H04W 76/25* | (2018.01) | |
| *H04W 76/27* | (2018.01) | |
| *H04W 88/02* | (2009.01) | |
| *H04W 88/08* | (2009.01) | |

(52) U.S. Cl.
CPC ........... *H04W 68/02* (2013.01); *H04W 76/19* (2018.02); *H04W 76/25* (2018.02); *H04W 76/27* (2018.02); *H04W 88/023* (2013.01); *H04W 88/08* (2013.01)

(56) References Cited

U.S. PATENT DOCUMENTS

| | | | | |
|---|---|---|---|---|
| 2014/0146759 | A1* | 5/2014 | Cho | H04W 76/27 370/329 |
| 2016/0066232 | A1* | 3/2016 | Wang | H04W 48/18 370/332 |
| 2016/0128007 | A1* | 5/2016 | Keskitalo | H04W 56/001 370/350 |
| 2016/0249402 | A1* | 8/2016 | Zhang | H04W 76/27 |
| 2017/0311278 | A1 | 10/2017 | Adjakple et al. | |
| 2018/0084524 | A1 | 3/2018 | Pradas et al. | |
| 2018/0110029 | A1* | 4/2018 | Kim | H04W 68/12 |

FOREIGN PATENT DOCUMENTS

| | | |
|---|---|---|
| CN | 104115536 A | 10/2014 |
| JP | 2015512206 A | 4/2015 |
| KR | 101296578 B1 | 8/2013 |

OTHER PUBLICATIONS

Ericsson, "Paging in Light Conneciton," R2-166950, Discussion, Decision, 8.9.4, 3GPP TSG-RAN WG2 #95bis, Kaohsiung, Taiwan, Oct. 10-14, 2016, the whole document.
NTT Docomo, Inc., "Discussion on RRC state mismatch issue," R2-167140, Discussion, 8.22, 3GPP TSG-RAN WG2 #95bis, Kaohsiung, Taiwan, Oct. 10-14, 2016, the whole document.
Ericsson, "DRX in idle and "inactive state"", R2-166960, Discussion, Decision, 9.2.2.1, 3GPP TSG-RAN WG2 #95bis, Kaohsiung, Taiwan, Oct. 10-14, 2016, the whole document.
Intel Corporation, "RAN-initiated paging and DRX cycle", R2-166690, Discussion and decision, 8.9.3, 3GPP TSG RAN WG2 Meeting #95 bis, Kaohsiung, Oct. 10-14, 2016, the whole document. s.
CATT, "MME initiated paging for light connected UE", R3-161114, Discussion and Decision, 21, 3GPP TSG RAN WG3 Meeting #92, Nanjing, China, May 23-27, 2016, whole document.
LG Electronics, "Interim agreement on paging area management", S2-165621, Discussion and Approval, 6.10.3, SA WG2 Meeting #117, Oct. 17-21, 2016, Kaohsiung, Taiwan, whole document.
Rapporteur (Ericsson), "Report from e-mail discussion on RRC procedures", TSGR2#7(99)A51, Decision, 5, TSG-RAN Working Group 2 (Radio layer 2 and Radio layer 3), Malmo, Sep. 20-24, 1999, whole document.
International Search Report in the international application No. PCT/CN2017/109060, mailed on Jan. 24, 2018 with English translation.
Written Opinion of the International Search Authority in the international application No. PCT/CN2017/109060, mailed on Jan. 24, 2018 with English translation.
First Office Action of the corresponding Chinese application No. 201610955201.6, issued on May 16, 2019.
Second Office Action and search report from the corresponding Chinese application No. 201610955201.6, issued May 16, 2019.
Non-Final Rejection of the U.S. Appl. No. 17/508,755, mailed on Nov. 30, 2022.
Decision to Grant a Patent for corresponding Japanese Patent Application No. 2019-522558, mailed Aug. 24, 2021.
Notification of Reason for Refusal for corresponding Korean Application No. 10-2019-7015901, mailed Apr. 24, 2020.
Extended European search report from the corresponding European application No. 17867354.7 issued on Oct. 2, 2019.
Office action for the corresponding Japanese Patent Application No. 2019-522558, mailed Jun. 9, 2020.
Non-Final Rejection of the U.S. Appl. No. 16/345,538 mailed on Nov. 30, 2020.
3GPP TSG-RAN3 meeting #92, R3-161167, Nanjing, China, May 23-27, 2016, Title: RAN initiated paging solution, source: Huawei, China telecom, all pages.

\* cited by examiner

PAGING METHOD, BASE STATION AND USER EQUIPMENT

CROSS-REFERENCE TO RELATED APPLICATIONS

The present application claims the benefit of and is a continuation of U.S. patent application Ser. No. 17/508,755 filed on Oct. 22, 2021, which claims the benefit of and is a continuation of U.S. patent application Ser. No. 16/345,538 filed on Apr. 26, 2019, which is the U.S. national phase of PCT Application No. PCT/CN2017/109060 filed on Nov. 2, 2017, which claims priority to the Chinese patent application No. 201610955201.6 filed on Nov. 3, 2016, the disclosures of which are incorporated herein by reference in their entireties.

TECHNICAL FIELD

The present disclosure relates to the field of wireless communication technology, in particular to a paging method, a base station and a User Equipment (UE).

BACKGROUND

A plurality of UE states has been defined in a Long Term Evolution (LTE) system, e.g., a Radio Resource Control (RRC) idle state (RRC_IDLE), an RRC connected state (RRC_CONNECTED) and a light connection state. Along with the development of the wireless communication system, more types of UEs and more types of services have emerged, and the reduction of power consumption of the UE and saving of network resources may coexist with the satisfaction of the requirements on various services types. Behaviors capable of being executed by the UE in various states will be described hereinafter.
1. The behaviors capable of being executed by the UE in the RRC_IDLE state may include: the selection of Public Land Mobile Network (PLMN); the configuration of Discontinuous Reception (DRX) via a Non-Access Stratum (NAS); the broadcasting of system information; paging; the mobility in a cell reselection mode; the allocation of a unique identifier for the UE in a certain Tracking Area (TA); UE context being not stored in an evolved Node B (eNB); the transmission and reception of sidelink communication data (Device-to-Device (D2D) communication); and the notification and monitoring of sidelink discovery (D2D discovery).
2. The behaviors capable of being executed by the UE in the RRC_CONNECTED state may include: that there is an Evolved Universal Mobile Telecommunications System (UMTS) Terrestrial Radio Access Network (E-UTRAN)-RRC connection for the UE; that there is the UE context at an E-UTRAN side; that the E-UTRAN is aware of a cell to which the UE belongs and allocates a Cell-Radio Network Temporary Identifier (C-RNTI) for the UE; that the data is capable of being transmitted and received between a network and the UE in accordance with the C-RNTI; the mobility controlled by the network; the measurement of a neighboring cell; the transmission and reception of sidelink communication data (D2D communication); the notification and monitoring of sidelink discovery (D2D discovery); Packet Data Convergence Protocol (PDCP)/Radio Link Control (RLC)/Media Access Control (MAC) layer; the transmission and reception of data between the UE and the network; that the UE monitors a control signaling channel related to a shared data channel so as to check whether data is transmitted on the shared data channel allocated for the UE; that the UE reports channel quality information and feedback information to the eNB; and that a DRX period is controlled by the eNB and configured by the eNB in accordance with an activity level of power-saving of the UE and the resource utilization.

State transition supported in the LTE system includes transition from the RRC_IDLE state to the RRC_CONNECTED state (at this time, it is necessary for the UE to initiate an access or reestablishment process), and transition from the RRC_CONNECTED state to the RRC_IDLE state through a release process.

In order to ensure the reduction of the power consumption of the UE and the rapid data transmission for the UE, currently a new UE state, i.e., an inactive state, has been introduced. In this state, the connection between the UE and a core network is maintained. However, the UE is incapable of performing conventional operation in an air-interface connected state (e.g., switching, updating of uplink timing, and radio link monitoring), and no UE Identifier (ID) for the air-interface transmission (e.g., the C-RNTI) is allocated for the UE, so it is impossible for the UE to perform any air-interface scheduling operation. In addition, in the inactive state, the UE needs to monitor a paging message, so as to receive a call from a network side. There are the following characteristics for the inactive state. The core network considers that the UE is in a connected state. The mobility management is performed by the UE in a Radio Access Network (RAN) TA pre-configured at a network side through a cell reselection process rather than a handover process. A unique user ID has been allocated for the UE in the RAN TA pre-configured at the network side.

In the inactive state, a valid RAN ID in a certain area is allocated by the network side for the UE, so as to identify the UE in the inactive state. When the network side searches for the UE or the UE initiates an uplink access process, the UE may enter the connected state through the RAN ID. This ID may also be called as an inactive UE ID or a resume UE ID. Different from a globally unique International Mobile Subscriber Identity (IMSI) or the C-RNTI, the inactive UE ID may have a length between lengths of the IMSI and the C-RNTI (e.g., the inactive UE ID has a length of 40 bits, and the C-RNTI has a length of 16 bits). In addition, the inactive UE ID may merely be valid in a certain area including a plurality of cells or base stations (eNBs). When the UE has moved beyond this area, it is necessary for the UE to update the inactive UE ID.

When the UE is in the inactive state, there is no connection between the UE and the base station, but the UE is capable of receiving a paging message and initiating a service, so it is able to save electric quantity of the UE. In the inactive state, the UE monitors the paging message in accordance with a paging period for the inactive state, and when the UE is in the RRC_IDLE state, the UE monitors the paging message in accordance with a paging period for the RRC_IDLE state. The paging period for the UE in the inactive state is configured by the base station, and the paging period for the UE the RRC_IDLE state is configured by the core network. A relationship between the two paging periods is not defined.

When the network side (including the base station and the core network) has released the context of the UE in the inactive state due to its own reasons without notifying the UE, or a notification message to be transmitted to the UE has been lost at an air interface, the state of the UE may be understood by the UE and the network side differently. To be specific, the network side may think that the UE is in the idle state (i.e., an Access Stratum (AS) and the Non-Access Stratum (NAS) are both in the idle state), an AS of the UE may think that the AS of the UE is in the inactive state, and an NAS of the UE may think that the NAS of the UE is in the CONNECTED state. Because the paging period for the inactive state is different from the paging period for the idle state, when the network side initiates a paging process for the core network, it is impossible for the UE to receive the paging message.

Hence, when the UE is in the inactive state, the paging process for the UE may be adversely affected because the state of the UE is understood by the network side and the UE differently.

SUMMARY

An object of the present disclosure is to provide a paging method, a base station and a UE, so as to prevent the paging process from being adversely affected due to the state of the UE in the inactive state is understood by the network and the UE differently.

In one aspect, the present disclosure provides in some embodiments a paging method, including: receiving, by a UE in an inactive state, a paging message for determining a paging type, the paging message being transmitted from a base station, the paging type including an access network paging initiated by an access network or a core network paging initiated by a core network; determining, by the UE, the paging type corresponding to the paging message; and when the paging type corresponding to the paging message is the core network paging, updating, by the UE, each of states of a NAS and a RRC layer for the UE into an idle state, and responding to, by the UE, the paging message.

In another aspect, the present disclosure provides in some embodiments a paging method, including: determining, by a base station, a paging type of a paging for a UE when it is necessary for the base station to initiate the paging for the UE, the paging type including an access network paging initiated by an access network or a core network paging initiated by a core network; and transmitting, by the base station, a paging message for determining the paging type to the UE.

In yet another aspect, the present disclosure provides in some embodiments a UE, including: a reception unit configured to receive a paging message for determining a paging type when the UE is in an inactive state, wherein the paging message is transmitted from a base station, the paging type includes an access network paging initiated by an access network or a core network paging initiated by a core network; a determination unit configured to determine the paging type corresponding to the paging message; and a first response unit configured to, when the paging type corresponding to the paging message is the core network paging, update each of states of an NAS and an RRC layer for the UE into an idle state, and respond to the paging message.

In still yet another aspect, the present disclosure provides in some embodiments a base station, including: a determination unit configured to determine a paging type of a paging for a UE when it is necessary for the base station to initiate the paging for the UE, wherein the paging type includes an access network paging initiated by an access network or a core network paging initiated by a core network; and a transmission unit configured to transmit a paging message for determining the paging type to the UE.

In still yet another aspect, the present disclosure provides in some embodiments a UE, including a processor, a transceiver and a memory. The processor is configured to read a program stored in the memory, so as to: receive a paging message for determining a paging type when the UE is in an inactive state, wherein the paging message is transmitted from a base station, the paging type includes an access network paging initiated by an access network or a core network paging initiated by a core network; determine the paging type corresponding to the paging message; and when the paging type corresponding to the paging message is the core network paging, update each of states of an NAS and an RRC layer for the UE into an idle state, and respond to the paging message. The transceiver is configured to receive and transmit data. The memory is configured to store therein data for the operation of the processor.

In still yet another aspect, the present disclosure provides in some embodiments a base station, including a processor, a transceiver and a memory. The processor is configured to read a program stored in the memory, so as to: determine a paging type of a paging for a UE when it is necessary for the base station to initiate the paging for the UE, wherein the paging type includes an access network paging initiated by an access network or a core network paging initiated by a core network; and transmit a paging message for determining the paging type to the UE. The transceiver is configured to receive and transmit data. The memory is configured to store therein data for the operation of the processor.

According to the paging method, the UE and the base station in the embodiments of the present disclosure, during the paging process for the UE in the inactive state, as compared with the related art, it is able to prevent the occurrence of a paging failure for the UE when the state of the UE is understood by the network and the UE differently, thereby to enable the UE to accurately receive the paging message and improve a success rate of the paging process.

DETAILED DESCRIPTION OF THE EMBODIMENTS

In order to make the objects, the technical solutions and the advantages of the present disclosure more apparent, the present disclosure will be described hereinafter in a clear and complete manner in conjunction with the drawings and embodiments. In the following description, specific details of configurations and assemblies are merely provided to facilitate the understanding of the present disclosure. It should be appreciated that, a person skilled in the art may make further modifications and alternations without departing from the spirit of the present disclosure. In addition, for clarification and concision, any known function and structure will not be described hereinafter.

It should be further appreciated that, such phrases as "one embodiment" and "an embodiment" intend to indicate that the related features, structures or characteristics are contained in at least one embodiment of the present disclosure, rather than necessarily referring to a same embodiment. In addition, the features, structures or characteristics may be combined in any embodiment or embodiments in an appropriate manner.

It should be appreciated that, the following serial numbers do not refer to the order of the steps. Actually, the order shall be determined in accordance with functions and internal logic of the steps, but shall not be construed as limiting the implementation in any form.

In addition, the terms "system" and "network" may be replaced with each other.

It should be appreciated that, the expression "and/or" is merely used to describe the relationship between objects, and it includes three relationships. For example, "A and/or B" may represent that, there is only A, there are both A and B, and there is only B. Further, the symbol "/" usually refers to "or".

It should be further appreciated that, the expression "B corresponding to A" means that B is related to A and may be determined in accordance with A. It should be further appreciated that, in the case that B is determined in accordance with A, it means that B may be determined in accordance with A and/or any other information.

In some embodiments of the present disclosure, A UE may be a mobile phone (or cell phone) or any other device capable of transmitting or receiving a radio signal, including a UE, a Personal Digital Assistant (PDA), a wireless modem, a wireless communication device, a handheld device, a laptop computer, a cordless telephone, a Wireless Local Loop (WLL) station, Customer Premise Equipment (CPE) or a mobile smart hotspot capable of converting a mobile signal into a WiFi signal, an intelligent household electrical appliance, or any other device capable of spontaneously communicating with a mobile communication network without manual operation.

In some embodiments of the present disclosure, the form of the base station will not be particularly defined, and it may be a macro base station, a pico base station, a Node B (i.e., a $3^{rd}$-Generation (3G) base station), an evolved NodeB (eNB), a femto eNB (or Home eNode B or Home eNB (HeNB)), a relay, an access point, a Remote Radio Unit (RRU), a Remote Radio Head (RRH), or the like. In addition, along with the development of the $5^{th}$-Generation (5G) technology, the base station may also be any other functional node, e.g., a Central Unit (CU) or a Distributed Unit (DU). The scheme in the embodiments of the present disclosure may be applied to the . . . above scenarios. Radio Access Network (RAN) architecture in an LTE networking scenario in the 5G technology and a possible networking scenario will be described briefly hereinafter.

The LTE networking scenario in the 5G technology: a base station+a UE.

Figure 1:
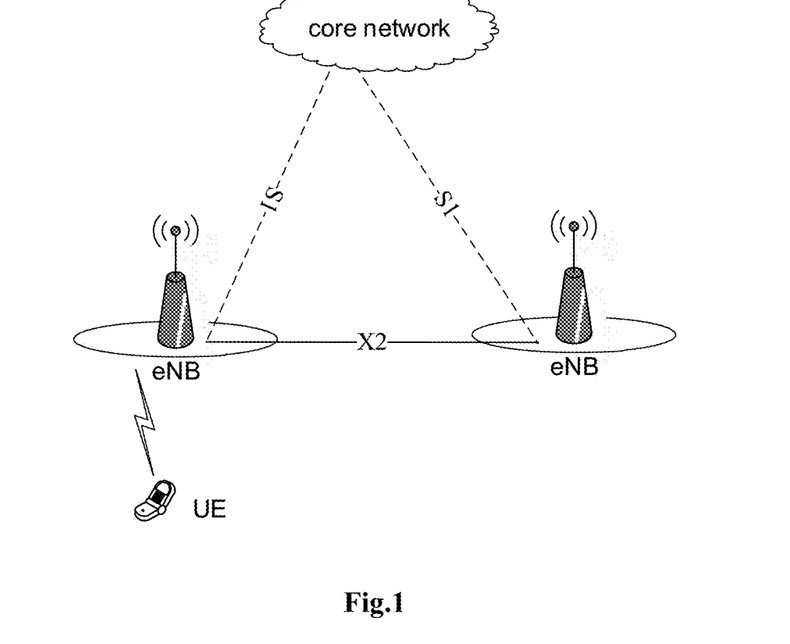
FIG. 1 is a schematic view showing an application scenario for a wireless system area management method according to some embodiments of the present disclosure.

FIG. 1 shows a typical LTE architecture. There is a plurality of cells in a coverage of each base station (eNB), and the UE in a connected state may receive data from and transmit data to the cell via an air interface. The UE in the connected state may be allocated with a unique UE ID in the cell, i.e., a C-RNTI. The base stations may communicate with each other via an X2 interface, and each base station may communicate with a core network via an S1 interface.

5G networking scenario: a network side node may include CUs and DUs, and a UE side node may include UEs.

Figure 2:
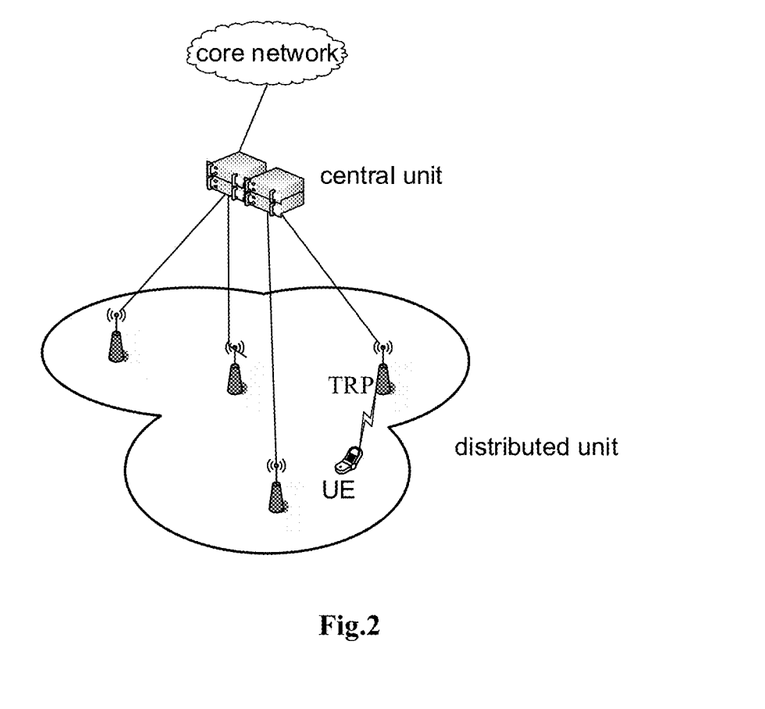
FIG. 2 is a schematic view showing another application scenario for the wireless system area management method according to some embodiments of the present disclosure.

FIG. 2 shows a possible architecture of a coming 5G mobile communication system. The network side node may include CUs and DUs, and each CU may control a plurality of DUs deployed in a certain area. These DUs may also be called as Transmission Reception Points (TRPs). Each TRP may communicate with the UE via an air interface. Each UE may be served by one or more TRPs simultaneously, so as to perform the data transmission. Here, it is necessary to allocate by the network side a unique air-interface ID for each UE (e.g., a C-RNTI or a TRP-RNTI), so as to schedule and transmit the data.

The scheme in the embodiments of the present disclosure may be applied to the above two types of RAN architecture, or another scenario. For ease of description, in the embodiments of the present disclosure, nodes for transmitting and receiving radio signaling and data at the network side, including eNBs in FIG. 1 and CUs/DUs n FIG. 2 (TRPs serving as the nodes), may be collectively called as base station. In addition, the UE unique ID for the transmission for the UE in a connected state may be called as unique air-interface transmission ID for the UE, i.e., a C-RNTI in a conventional LTE system, and a unique ID of the UE in an inactive state in a certain area may be called as inactive UE ID.

Figure 3:
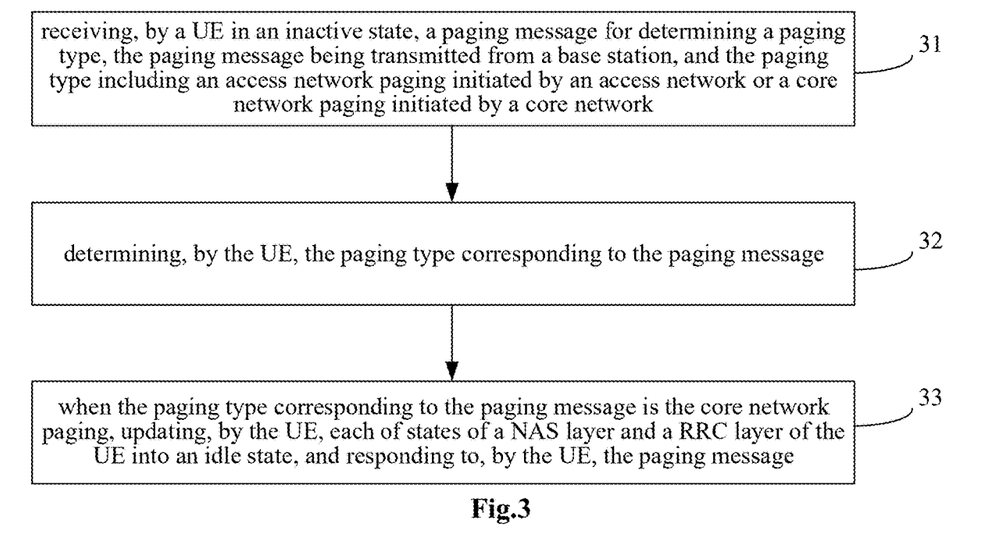
FIG. 3 is a flow chart of a paging method according to some embodiments of the present disclosure.

As shown in FIG. 3, the present disclosure provides in some embodiments a paging method for use at a UE side, which includes the following steps.

Step 31: receiving, by a UE in an inactive state, a paging message for determining a paging type, the paging message being transmitted from a base station, and the paging type including an access network paging initiated by an access network or a core network paging initiated by a core network.

Usually, the core network paging is a paging initiated by the core network with respect to the UE in an active state (e.g., an RRC_CONNECTED state), and the access network paging is a paging initiated by the base station with respect to the UE in the inactive state. It should be appreciated that, the core network paging also needs to be forwarded by the base station to the UE. In the embodiments of the present disclosure, the paging message from the base station may be adopted to determine the paging type corresponding to the paging message. To be specific, the base station may indicate the paging type explicitly or implicitly through the paging message.

Step 32: determining, by the UE, the paging type corresponding to the paging message.

Step 33: when the paging type corresponding to the paging message is the core network paging, updating, by the UE, each of states of a NAS and a RRC layer for the UE into an idle state, and responding to, by the UE, the paging message.

In some embodiments of the present disclosure, through the above steps, when the UE in the inactive state receives the core network paging, the UE in the inactive state may update its own NAS and RRC layer into the idle state, so as to respond to the paging message in accordance with a behavior of the UE defined in the idle state, thereby to prevent the paging processing from being adversely affected when the state of the UE is understood by the network and the UE differently.

In some embodiments of the present disclosure, when the paging type corresponding to the paging message is the access network paging in Step 32, the UE may directly respond to the paging message, and initiate a connection recovery, establishment or reestablishment process. For example, the UE may directly respond to the paging message at the RRC layer, and initiate the connection recovery, establishment or reestablishment process. A subsequent paging responding procedure may refer to that mentioned in the related art, and thus will not be particularly defined herein.

In some embodiments of the present disclosure, the base station may indicate the paging type in an explicit or implicit manner. Indication modes will be described illustratively hereinafter in some embodiments of the present disclosure. It should be appreciated that any other mode capable of indicating the paging type for the UE may also be adopted.

1) Explicit Indication

The base station may carry indication information of the paging type in the paging message. At this time, in Step 32, the UE may determine the paging type corresponding to the paging message in accordance with the indication information.

For example, the paging type may be indicated through a specific 1-bit value of an indication bit. When the value is 0, it means that the paging type is the access network paging, and when the value is 1, it means that the paging type is the core network paging. The UE may read the value of the indication bit, so as to determine the paging type.

2) Implicit Indication 2.1) The base station may carry a predetermined parameter expressed in predetermined expression modes in the paging message, and different expression modes of the predetermined parameter may correspond to different paging types. At this time, in Step 32, the UE may determine the paging type corresponding to the expression mode of the predetermined parameter in the paging message, thereby to acquire the paging type corresponding to the paging message.

For example, the access network paging and the core network paging may be provided with different UE paging IDs. To be specific, the access network paging may be provided with an inactive UE ID or a resume ID, while the core network paging may be provided with an S-Temporary Mobile Station Identity (S-TMSI) or IMSI. The UE may determine the paging type in accordance with an expression mode of the UE paging ID in the paging message.

2.2) The base station may carry or not carry a first predetermined parameter in the paging message, and whether the first predetermined parameter is carried in the paging message may be determined in accordance with the paging type. At this time, in Step 32, the UE may determine the paging type corresponding to the paging message in accordance with whether the first predetermined parameter is carried in the paging message.

For example, the core network paging may carry a core network domain parameter, e.g., CN-Domain, so as to identify whether the paging is a Packet Switching (PS) domain paging or a Circuit Switching (CS) domain paging. The access network paging may not carry the parameter. Upon the receipt of the paging message, the UE may determine whether the paging type is the core network paging or the access network paging in accordance with whether the core network domain parameter is carried in the paging message.

In Step 33, when the paging type corresponding to the paging message is the core network paging, the UE may update each of the states of the NAS and the RRC layer for the UE into the idle state, respond to the paging message in the idle state, and execute a corresponding paging responding behavior. For example, the UE may update the states of the NAS and the RRC layer in the following modes.

Mode 1: the RRC layer for the UE may update the state of the RRC layer into the idle state, and notify the NAS to release a connection for the UE. Then, the NAS for the UE may update its state into the idle state too in accordance with a notification from the RRC layer. The RRC layer for the UE may deliver paging content in the paging message to the NAS, and the NAS may receive the paging content and respond thereto.

In mode 1, the RRC layer, as a dominant one, may notify the NAS to update its state, and deliver the paging content in the paging message to the NAS, so as to perform a responding procedure of the paging message in the idle state.

Mode 2: the RRC layer for the UE may deliver the paging content in the paging message to the NAS, and update the state of the RRC layer into the idle state. Upon the receipt of the paging content, the NAS for the UE may update its state into the idle state, and respond to the paging content.

In mode 2, upon the receipt of the paging content delivered from the RRC layer, the NAS may update its own state into the idle state, and then perform the responding procedure of the paging message in the idle state.

The updating of the state may be achieved through updating a corresponding state of a state machine in the layer. When the state machine is in different states, the UE may perform the behavior corresponding to each state, e.g., respond to the paging message. The behaviors may refer to relevant definitions in the known standard, and thus will not be particularly defined herein.

It should be appreciated that, the above updating modes are for illustrative purposes only, and the UE may update the states in any other modes, which will not be particularly defined herein.

Figure 4:
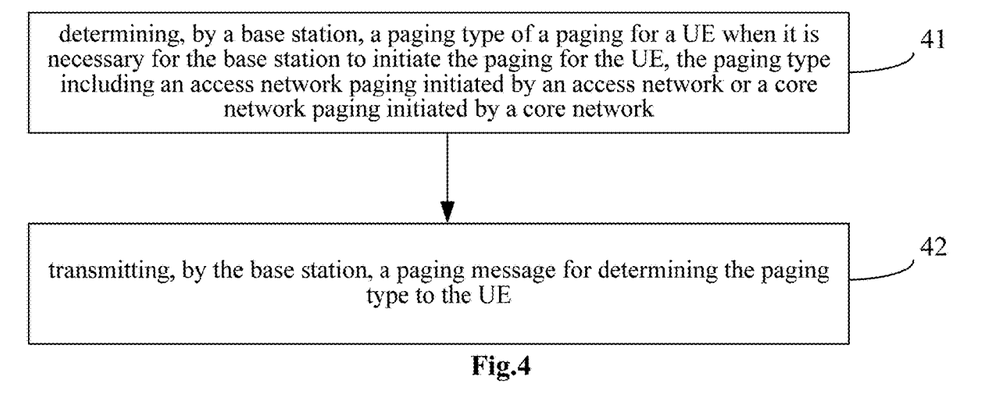
FIG. 4 is a flow chart of another paging method according to some embodiments of the present disclosure.

As shown in FIG. 4, the present disclosure further provides in some embodiments a paging method for use at a base station side, which includes the following steps.

Step 41: determining, by a base station, a paging type of a paging for a UE when it is necessary for the base station to initiate the paging for the UE, the paging type including an access network paging initiated by an access network or a core network paging initiated by a core network.

Here, the base station may determine whether the paging type is the core network paging or the access network paging in accordance with an initiator which has initiated the paging.

Step 42: transmitting, by the base station, a paging message for determining the paging type to the UE.

Here, the paging type may be indicated to the UE through the paging passage with reference to the above-mentioned explicit or implicit indication mode.

For example, when the explicit indication mode is adopted, the indication information of the paging type may be carried in the paging message. At this time, in Step 42, the base station may transmit the paging message carrying the indication information of the paging type to the UE, wherein different expression modes of the predetermined parameter may correspond to different paging types.

For another example, when the implicit indication mode is adopted, the predetermined parameter expressed in the predetermined expression mode may be carried in the paging message, and different expression modes of the predetermined parameter may correspond to different paging types. At this time, in Step 42, the base station may determine the expression mode of the predetermined parameter in accordance with the paging type, and then transmit the paging message carrying the predetermined parameter expressed in the predetermined expression mode to the UE.

For yet another example, when the implicit indication mode is adopted, the first predetermined parameter may be carried or not carried in the paging message, and whether the first predetermined parameter is carried in the paging message may be determined in accordance with the paging type. At this time, in Step 42, the base station may determine whether the first predetermined parameter is carried in the paging message in accordance with the paging type, and then transmit the paging message carrying or not carrying the first predetermined parameter to the UE.

It can be seen from above that, according to the embodiments of the present disclosure, the base station may indicate the paging type in the paging message. Upon the receipt of the paging message, the UE in the inactive state may update the states of the NAS and the RRC into the idle state, and then respond to the paging message. As a result, it is able for both a network side and a UE side to complete a paging behavior of the UE based on a same UE state, thereby to prevent the paging process from being adversely affected when the state of the UE is understood by the network and the UE differently.

The base station and the UE for the implementation of the above methods will be described hereinafter.

Figure 5:
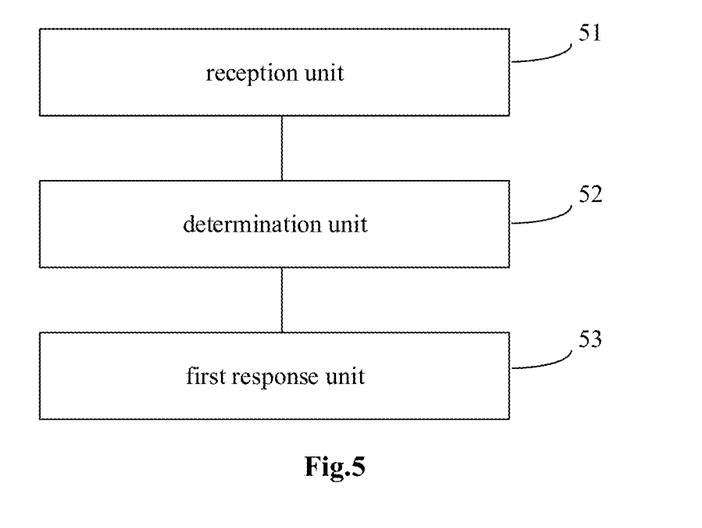
FIG. 5 is a schematic view showing a UE according to some embodiments of the present disclosure.

As shown in FIG. 5, the present disclosure further provides in some embodiments a UE which includes: a reception unit 51 configured to receive a paging message for determining a paging type when the UE is in an inactive state, wherein the paging message is transmitted from a base station, the paging type includes an access network paging initiated by an access network or a core network paging initiated by a core network; a determination unit 52 configured to determine the paging type corresponding to the paging message; and a first response unit 53 configured to, when the paging type corresponding to the paging message is the core network paging, update each of states of an NAS and an RRC layer for the UE into an idle state, and respond to the paging message.

In a possible embodiment of the present disclosure, the first response unit 53 may include: a first processing unit located at the RRC layer and configured to update the state of the RRC layer for the UE into the idle state, notify the NAS for the UE to release a connection for the UE, and deliver paging content in the paging message to the NAS; and a second processing unit located at the NAS and configured to update the state of the NAS into the idle state in accordance with a notification from the first response unit, receive the paging content delivered from the first processing unit, and respond to the paging content.

In a possible embodiment of the present disclosure, the first response unit 53 may include: a third processing unit located at the RRC layer and configured to deliver the paging content in the paging message to the NAS, and update the state of the RRC layer into the idle state; and a fourth processing unit located at the NAS and configured to, upon the receipt of the paging content delivered from the third processing unit, update the state of the NAS into the idle state, and respond to the paging content.

Here, the UE may further include a second response unit configured to, when the paging type is the access network paging, directly respond to the paging message, and initiate a connection recovery, establishment or reestablishment process.

To be specific, the second response unit may include a fifth processing unit located at the RRC layer and configured to respond to the paging message at the RRC layer, and initiate the connection recovery, establishment or reestablishment process.

In a possible embodiment of the present disclosure, indication information of the paging type may be carried in the paging message. At this time, the determination unit 52 is further configured to determine the paging type corresponding to the paging message in accordance with the indication information.

In another possible embodiment of the present disclosure, a predetermined parameter expressed in a predetermined expression mode may be carried in the paging message, and different expression modes of the predetermined parameter may correspond to different paging types. At this time, the determination unit 52 is further configured to determine the paging type corresponding to the expression mode of the predetermined parameter in the paging message, thereby to acquire the paging type corresponding to the paging message.

In yet another possible embodiment of the present disclosure, a first predetermined parameter may be carried or not carried in the paging message, and whether the first predetermined parameter is carried in the paging message may be determined in accordance with the paging type. At this time, the determination unit 52 is further configured to determine the paging type corresponding to the paging message in accordance with whether the first predetermined parameter is carried in the paging message.

Figure 6:
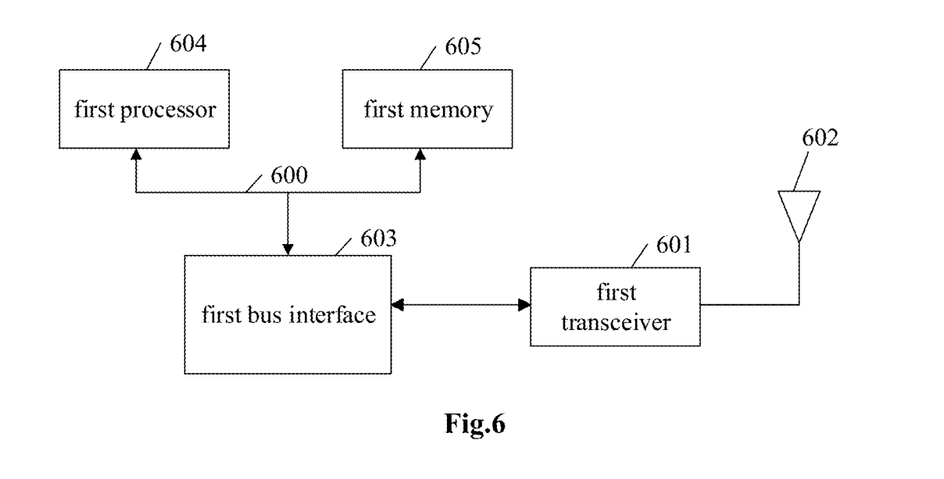
FIG. 6 is another schematic view showing the UE according to some embodiments of the present disclosure.

As shown in FIG. 6, the present disclosure further provides in some embodiments a UE which includes a first transceiver 601, a first processor 604 and a first memory 605. The first transceiver 601 is configured to receive and transmit data under the control of the first processor 604. To be specific, the first transceiver 601 may receive a paging message for determining a paging type from the base station, and the paging type may include an access network paging initiated by an access network or a core network paging initiated by a core network. The first processor 604 is configured to read a program stored in the first memory 605, so as to: determine the paging type corresponding to the paging message in accordance with the paging message received through the first transceiver 601; and when the paging type corresponding to the paging message is the core network paging, update states of an NAS and an RRC layer for the UE each into an idle state, and respond to the paging message.

In FIG. 6, bus architecture (represented by a first bus 600) may include a number of buses and bridges connected to each other, the first bus 600 connects various circuits including one or more processors represented by the processor 604 and one or more memories represented by the first memory 605. In addition, as is known in the art, the first bus 600 may also be used to connect various other circuits, such as a circuit for a peripheral device, a circuit for a voltage stabilizer and a power management circuit, which are not particularly defined herein. A first bus interface 603 may be provided between the first bus 600 and the first transceiver 601, and the first transceiver 601 may consist of one element, or more than one element, e.g., transmitters and receivers, so as to provide a unit for communication with various other devices over a transmission medium. Data processed by the first processor 604 may be transmitted on a wireless medium via the first transceiver 601 and a first antenna 602. Further, the first antenna 602 may further receive data and transmit the data to the first processor 604 via the first transceiver 601.

The first processor 604 may take charge of managing the first bus 600 as well as general processings, and may further provide various functions such as timing, peripheral interfacing, voltage adjustment, power source management and other control functions. The first memory 605 may store therein data for the operation of the first processor 604. To be specific, the first processor 604 may be a Central Processing Unit (CPU), an Application Specific Integrated Circuit (ASIC), a Field-Programmable Gate Array (FPGA) or a Complex Programmable Logic Device (CPLD).

In a possible embodiment of the present disclosure, the first processor 604 is further configured to, upon determining that the paging type corresponding to the paging message is the core network paging, control the RRC layer for the UE to update the state of the RRC layer into the idle state, notify the NAS to release a connection for the UE, control the NAS for the UE to update the state of the NAS into the idle state, control the RRC layer for the UE to deliver paging content in the paging message to the NAS, and control the NAS to receive the paging content and respond to the paging content.

In a possible embodiment of the present disclosure, the first processor 604 is further configured to, upon determining that the paging type corresponding to the paging message is the core network paging, control the RRC layer for the UE to deliver the paging content in the paging message to the NAS, control the RRC layer to update the state of the RRC layer into the idle state, and control the NAS for the UE to update the state of the NAS into the idle state and respond to the paging content after the NAS has received the paging content.

The first processor 604 is further configured to, upon determining the paging type corresponding to the paging message is the access network paging, directly respond to the paging message, and initiate a connection recovery, establishment or reestablishment process. To be specific, the first processor 604 may directly respond to the paging message at the RRC layer, and initiate the connection recovery, establishment or reestablishment process.

In a possible embodiment of the present disclosure, indication information of the paging type may be carried in the paging message. The first processor 604 is further configured to determine the paging type corresponding to the paging message in accordance with the indication information. In another possible embodiment of the present disclosure, a predetermined parameter expressed in a predetermined expression mode may be carried in the paging message, and different expression modes of the predetermined parameter may correspond to different paging types. The first processor 604 is further configured to determine the paging type corresponding to the expression mode of the predetermined parameter in the paging message, so as to acquire the paging type corresponding to the paging message. In yet another possible embodiment of the present disclosure, a first predetermined parameter may be carried or not carried in the paging message, and whether the first predetermined parameter is carried in the paging message may be determined in accordance with the paging type. The first processor 604 may determine the paging type corresponding to the paging message in accordance with whether the first predetermined parameter is carried in the paging message.

Figure 7:
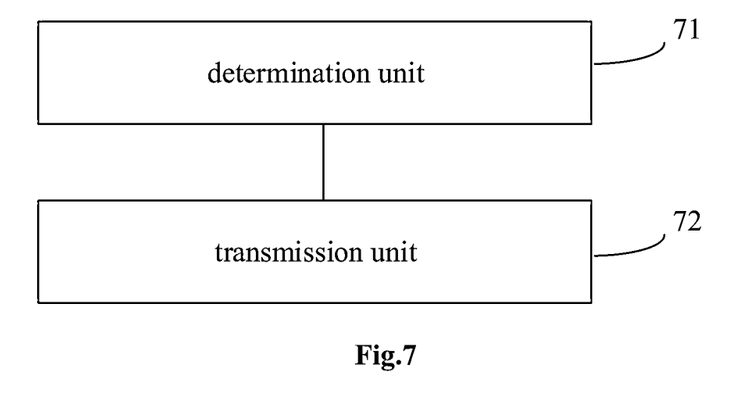
FIG. 7 is a schematic view showing a base station according to some embodiments of the present disclosure.

As shown in FIG. 7, the present disclosure further provides in some embodiments a base station, which includes: a determination unit 71 configured to determine a paging type of a paging for a UE when it is necessary for the base station to initiate the paging for the UE, wherein the paging type includes an access network paging initiated by an access network or a core network paging initiated by a core network; and a transmission unit 72 configured to transmit a paging message for determining the paging type to the UE.

Herein, indication information of the paging type may be carried in the paging message; or a predetermined parameter expressed in a predetermined expression mode may be carried in the paging message, and different expression modes of the predetermined parameter may correspond to different paging types; or a first predetermined parameter may be carried or not carried in the paging message, and whether the first predetermined parameter is carried in the paging message may be determined in accordance with the paging type.

Figure 8:
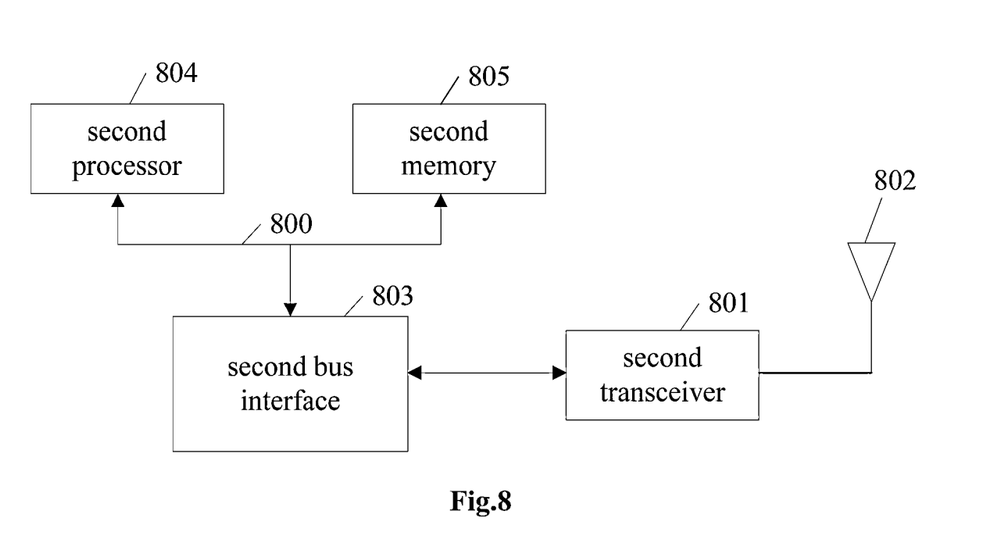
FIG. 8 is another schematic view showing the base station according to some embodiments of the present disclosure.

As shown in FIG. 8, the present disclosure further provides in some embodiments a base station, which includes a second transceiver 801, a second processor 804 and a second memory 805. The second transceiver 801 is configured to receive and transmit data under the control of the second processor 804. To be specific, the second transceiver 801 may transmit a paging message for determining the paging type to a UE. The second processor 804 is configured to read a program stored in the second memory 805, so as to: determine the paging type when it is necessary to initiate a paging for the UE, the paging type including an access network paging initiated by an access network or a core network paging initiated by a core network; and control the second transceiver 801 to transmit the paging message for determining the paging type to the UE.

In FIG. 8, bus architecture (represented by a second bus 800) may include a number of buses and bridges connected to each other, the second bus 800 connects various circuits including one or more processors represented by the processor 804 and one or more memories represented by the second memory 805. In addition, as is known in the art, the second bus 800 may also be used to connect various other circuits, such as a circuit for a peripheral device, a circuit for a voltage stabilizer and a power management circuit, which are not particularly defined herein. A second bus interface 803 may be provided between the second bus 800 and the second transceiver 801, and the second transceiver 801 may consist of one element, or more than one element, e.g., transmitters and receivers, so as to provide a unit for communication with various other devices over a transmission medium. Data processed by the second processor 804 may be transmitted on a wireless medium via the second transceiver 801 and a second antenna 802. Further, the second antenna 802 may further receive data and transmit the data to the second processor 804 via the second transceiver 801.

The second processor 804 may take charge of managing the second bus 800 as well as general processings, and may further provide various functions such as timing, peripheral interfacing, voltage adjustment, power source management and other control functions. The second memory 805 may store therein data for the operation of the second processor 804. To be specific, the second processor 804 may be a CPU, an ASIC, a FPGA or a CPLD.

According to the paging method, the base station and the UE in the embodiments of the present disclosure, during the paging process for the UE in the inactive state, it is able to prevent the occurrence of a paging failure for the UE when the state of the UE is understood by the network and the UE differently, thereby to enable the UE to accurately receive the paging message and improve a success rate of the paging process.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or another programmable data processing device to create a machine, so that instructions executable by the processor of the computer or the other programmable data processing device may create a device to achieve the functions assigned in one or more work flows in the flow chart and/or one or more blocks in the block diagram.

These computer program instructions may also be stored in a computer readable storage that may guide the computer or the other programmable data process device to function in a certain way, so that the instructions stored in the computer readable storage may create a product including an instruction device which achieves the functions assigned in one or more flows in the flow chart and/or one or more blocks in the block diagram.

These computer program instructions may also be loaded in the computer or the other programmable data process device, so that a series of operation steps are executed on the computer or the other programmable device to create processes achieved by the computer. Therefore, the instructions executed in the computer or the other programmable device provide the steps for achieving the function assigned in one or more flows in the flow chart and/or one or more blocks in the block diagram.

The above are merely preferred embodiments of the present disclosure. A person skilled in the art may make further modifications and improvements without departing from the principle of the present disclosure, and these modifications and improvements shall also fall within the scope of the present disclosure.

What is claimed is:

1. A paging method, comprising:
   receiving a paging message being transmitted from a base station, by a User Equipment (UE) in an inactive state, wherein a paging message is for determining a paging type, wherein the paging type comprises an access network paging initiated by an access network or a core network paging initiated by a core network,
   determining, by the UE, the paging type corresponding to the paging message, and
   when the paging type corresponding to the paging message is the core network paging, updating, by the UE, each of states of a Non-Access Stratum (NAS) layer and a Radio Resource Control (RRC) layer of the UE into an idle state, and responding to, by the UE, the paging message.

2. The paging method according to claim 1, wherein the updating by the UE each of the states of the NAS layer and the RRC layer of the UE into the idle state and responding to by the UE the paging message comprises:
   updating, by the RRC layer of the UE, a state of the RRC layer into the idle state and notifying, by the RRC layer of the UE, the NAS layer to release a connection for the UE, and updating, by the NAS layer of the UE, the state of the NAS layer into the idle state; and
   delivering, by the RRC layer of the UE, paging content in the paging message to the NAS layer, and receiving, by the NAS layer, the paging content and responding to, by the NAS layer, the paging content.

3. The paging method according to claim 1, wherein the updating by the UE each of the states of the NAS layer and the RRC layer of the UE into the idle state and responding to by the UE the paging message comprises:
   delivering, by the RRC layer of the UE, paging content in the paging message to the NAS layer, and updating RRC layer of the UE, the state of the RRC layer into the idle state; and
   upon the receipt of the paging content, updating, by the NAS layer of the UE, the state of the NAS layer into the idle state and responding to, by the NAS layer of the UE, the paging content.

4. The paging method according to claim 1, further comprising:
   when the paging type corresponding to the paging message is the access network paging, responding, by the UE, directly to the paging message, and initiating, by the UE, a connection recovery process, a connection establishment process or a connection reestablishment process.

5. The paging method according to claim 1, wherein indication information of the paging type is carried in the paging message; and
   the determining by the UE the paging type corresponding to the paging message comprises: determining, by the UE, the paging type corresponding to the paging message in accordance with the indication information.

6. The paging method according to claim 1, wherein a predetermined parameter expressed in a predetermined expression mode is carried in the paging message, and different expression modes of the predetermined parameter correspond to different paging types; and
   the determining by the UE the paging type corresponding to the paging message comprises: determining, by the UE, the paging type corresponding to the expression mode of the predetermined parameter in the paging message, to acquire the paging type corresponding to the paging message.

7. The paging method according to claim 1, wherein a first predetermined parameter is carried or not carried in the paging message, and it is determined whether the first predetermined parameter is carried in the paging message in accordance with the paging type; and
   the determining by the UE the paging type corresponding to the paging message comprises: determining, by the UE, the paging type corresponding to the paging message in accordance with whether the first predetermined parameter is carried in the paging message.

8. A paging method, comprising:
   determining, by a base station, a paging type of a paging for a UE when it is necessary for the base station to initiate the paging for the UE, the paging type comprising an access network paging initiated by an access network; and
   transmitting, by the base station, a paging message for determining the paging type to the UE, wherein the paging message is used for initiating a connection recovery process, a connection establishment process or a connection reestablishment process.

9. The paging method according to claim 8, wherein indication information of the paging type is carried in the paging message; or
   a predetermined parameter expressed in a predetermined expression mode is carried in the paging message, and different expression modes of the predetermined parameter correspond to different paging types; or a first predetermined parameter is carried or not carried in the paging message, wherein it is determined whether the first predetermined parameter is carried in the paging message in accordance with the paging type.

10. A UE, comprising a processor, a transceiver and a memory, wherein the processor is configured to read a program stored in the memory to:
receive a paging message for determining a paging type when the UE is in an inactive state, wherein the paging message is transmitted from a base station, and the paging type comprises an access network paging initiated by an access network or a core network paging initiated by a core network;
determine the paging type corresponding to the paging message; and
when the paging type corresponding to the paging message is the core network paging, update each of states of an NAS layer and an RRC layer of the UE into an idle state, and respond to the paging message,
wherein the transceiver is configured to receive and transmit data, and the memory is configured to store therein data for the operation of the processor.

11. The UE according to claim 10, wherein the processor is further configured to read the program stored in the memory to:
update, by the RRC layer of the UE, a state of the RRC layer into the idle state and notify, by the RRC layer of the UE, the NAS layer to release a connection for the UE, and update, by the NAS layer of the UE, the state of the NAS layer into the idle state, and
deliver, by the RRC layer of the UE, paging content in the paging message to the NAS layer, and receive, by the NAS layer, the paging content and respond to, by the NAS layer, the paging content.

12. The UE according to claim 10, wherein the processor is further configured to read the program stored in the memory to:
deliver, by the RRC layer of the UE, paging content in the paging message to the NAS layer, and update, by the RRC layer of the UE, the state of the RRC layer into the idle state, and
upon the receipt of the paging content, update, by the NAS layer of the UE, the state of the NAS layer into the idle state and respond to, by the NAS layer of the UE, the paging content.

13. The UE according to claim 10, wherein the processor is further configured to read the program stored in the memory to:
when the paging type corresponding to the paging message is the access network paging, respond directly to the paging message, and initiate a connection recovery process, a connection establishment process or a connection reestablishment process.

14. The UE according to claim 10, wherein
indication information of the paging type is carried in the paging message; and
the processor is further configured to read the program stored in the memory to: determine the paging type corresponding to the paging message in accordance with the indication information.

15. The UE according to claim 10, wherein
a predetermined parameter expressed in a predetermined expression mode is carried in the paging message, and different expression modes of the predetermined parameter correspond to different paging types; and
the processor is further configured to read the program stored in the memory to: determine the paging type corresponding to the expression mode of the predetermined parameter in the paging message, to acquire the paging type corresponding to the paging message.

16. The UE according to claim 10, wherein
a first predetermined parameter is carried or not carried in the paging message, and it is determined whether the first predetermined parameter is carried in the paging message in accordance with the paging type; and
the processor is further configured to read the program stored in the memory to: determine the paging type corresponding to the paging message in accordance with whether the first predetermined parameter is carried in the paging message.

17. A base station, comprising a processor, a transceiver and a memory, wherein the processor is configured to read a program stored in the memory to implement the paging method according to claim 8.

18. The base station according to claim 17, wherein
indication information of the paging type is carried in the paging message; or
a predetermined parameter expressed in a predetermined expression mode is carried in the paging message, and different expression modes of the predetermined parameter correspond to different paging types; or
a first predetermined parameter is carried or not carried in the paging message, wherein it is determined whether the first predetermined parameter is carried in the paging message in accordance with the paging type.

19. A non-transitory computer-readable storage medium, wherein the computer-readable storage medium stores a computer program, and the computer program is used to be executed by a processor to implement the paging method according to claim 1.

20. A non-transitory computer-readable storage medium, wherein the computer-readable storage medium stores a computer program, and the computer program is used to be executed by a processor to implement the paging method according to claim 8.

* * * * *